C. C. COOPER & H. F. RICHTER.
HEATER AND FUEL ECONOMIZER.
APPLICATION FILED APR. 29, 1912.

1,063,912.

Patented June 3, 1913.

Witnesses:
Floyd O. Chaffee
Edmund Hasold

Inventors
C. C. Cooper
H. F. Richter

UNITED STATES PATENT OFFICE.

CHARLES C. COOPER, OF LOS ANGELES, AND HERMAN F. RICHTER, OF PASADENA, CALIFORNIA.

HEATER AND FUEL-ECONOMIZER.

1,063,912.  Specification of Letters Patent.  Patented June 3, 1913.

Application filed April 29, 1912. Serial No. 694,003.

*To all whom it may concern:*

Be it known that we, CHARLES C. COOPER and HERMAN F. RICHTER, citizens of the United States, and residents of Los Angeles and Pasadena, respectively, in the county of Los Angeles and State of California, have invented certain new and useful Improvements in Heaters and Fuel-Economizers, of which the following is a specification.
Our invention has reference to a means for utilizing fuel for cooking purposes and it has special reference to a heater and fuel economizer adapted for the use of either liquid or gaseous fuel, and so arranged that by the use of a single burner an economical distribution of heat may be made.

The invention further provides a means whereby the heat may be directed to that part of the heater on which the vessel is placed for cooking purposes, so that the vessel itself causes the damper to open the channel leading to the combustion chamber.

The invention further consists in providing a heat retaining means whereby heat is stored up, and the same is disseminated after the burner is extinguished.

It still further provides a removable top for the heater body, which, when in position on the heater serves as a means for distributing heat over the entire top so that cooking may take place over the entire surface, all of which will now be set forth in detail.

Figure 1:
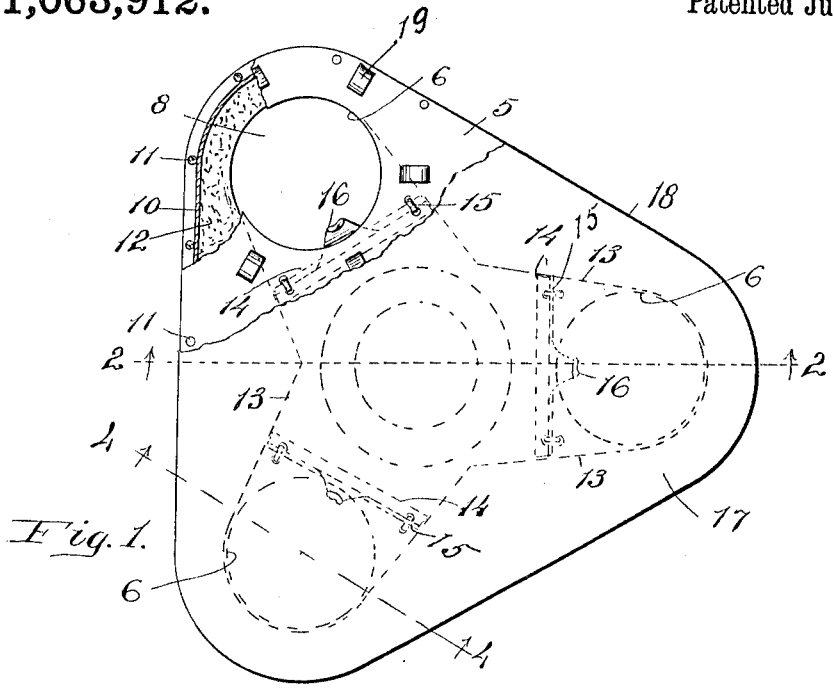
Figure 2:
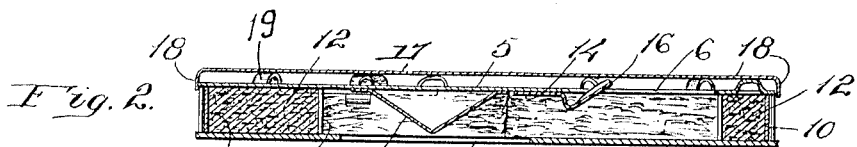
Figure 3:
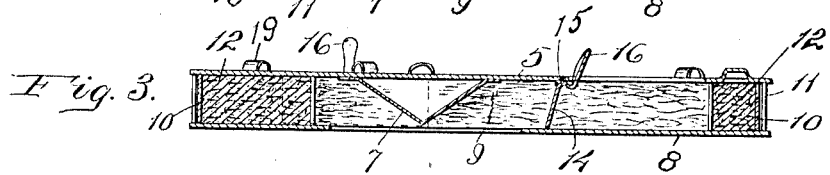
Figure 4:
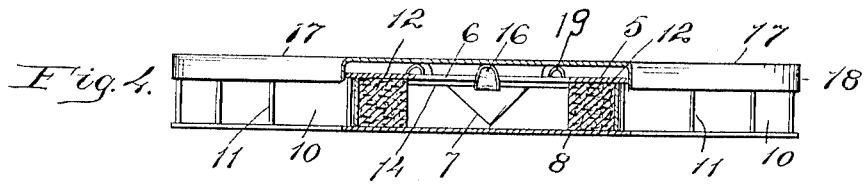

In the drawings, Figure 1 is a top view of the heater with portions cut away and in section. Fig. 2 is a vertical cross section of the heater, on line 2 of Fig. 1, with the top in position. Fig. 3 is a vertical cross section on line 2 of Fig. 1, showing the top removed, and Fig. 4 is a vertical cross section of the heater on line 4 of Fig. 1.

In carrying out our invention we prepare, as in this instance a pair of triangularly formed top and bottom plates, the top plate 5, having three circularly-formed openings 6, and centrally on its lower side is a downwardly-projecting conical shield 7. The lower plate 8 has centrally an opening 9, in which the burner, (not shown) is located, so it will be seen that the conical shield is directly above the burner when the latter is in position. In order to hold these plates in proper relation to each other, a metal rim 10, of suitable width is secured at the margins of these plates, and held in position by means of rivets 11 which pass through the margins of the plates, preferably outside of the rim 10, and as the plates and rim are of thin sheet metal the whole structure is light, compact, and easily transported and handled.

In the space between the two plates, 5, 8, we secure a body of asbestos, soapstone, or any other heat resisting and heat retaining material, this body of material 12, being held tightly against the inner side of the rim 10, so that it partially surrounds each opening 6 in the top plate and forms three radiating channels 13, leading from the central aperture 9 in the bottom plate to the openings 6 in the top plate, so that the heat is confined to the channels, and the structure thus provides a means whereby the heat of the single burner is utilized for the three openings 6.

In order that there may be no waste of heat when one or more of the holes 6 should not be covered by a cooking vessel, a damper 14 is located in each channel, this damper being hinged, as at 15 to the top plate. Each damper has an arm 16 which is slightly curved and projects upwardly through the opening 6, the arm and damper being in such a position relative to each other, that when there is no vessel on the opening the damper will be closed, but when a vessel is put over the opening the bottom of the vessel will engage with the arm and swing the damper up so as to make a clear conduit for the passage of the heat from the burner to the opening 6.

With a view of providing a heating surface for the entire top of the heater body, we provide a sheet metal top or cover, which comprises a plate 17, of the same general size as the top plate 5, which has a downturned marginal flange 18, so that it will snugly fit around the margin of the top plate. This cover is designed to rest on loops 19, which project up from the top plate, so that the cover and top plate 5 are slightly separated from each other, thereby permitting the heated gases to move freely between the cover and top plate, the heat being held in by the marginal flange
18. It will be observed that when the cover is placed in position the arms 16 are depressed thereby, thus opening all the dampers 14, and allowing the heated gases to freely move toward the three openings.

The heat retaining material surrounding the heater will conserve the heat, so that after the burner is extinguished it will continue to radiate its heat for some time.

While we show three openings 6, it is obvious that a greater number may be provided by constructing the top and bottom plates accordingly.

Any suitable burner (not shown) is located in the opening 9 of the bottom plate, and the heat from the burner ascending against the downwardly-projecting conical shield is deflected radially through the channels 13.

What we claim as new, is:

1. In a heater, an upper and a lower plate secured together by means of rivets, and a marginal rim, the upper plate having a plurality of openings for cooking vessels, and the lower plate having a central opening for the burner, side walls of heat-retaining material, conduits from the central opening in the lower plate to the openings in the upper plate formed by said plates and by side walls of heat retaining material, and dampers in said conduit, each damper having an arm which projects up into the adjacent opening and is adapted to open the damper when a vessel is placed on said opening.

2. In a heater, a top plate having openings for cooking vessels, a lower plate with a central opening for a burner, side walls of heat retaining material, conduits between the plates from the central opening of the lower plate to the openings of the top plate formed by said plates and side walls of heat retaining material, and a cover slightly elevated above the top plate, with a down-turned marginal flange adapted to fit snugly over the heater body.

3. In a heater, a top plate having openings for cooking vessels, a lower plate with a central opening for a burner, side walls of heat retaining material, conduits between the central opening of the lower plate and the openings of the top plate, formed by said plates and the side walls of heat retaining material, a damper in each conduit with an arm projecting upwardly therefrom through the adjacent opening and adapted to be engaged and the damper opened when a vessel is placed on the opening, and a removable cover the same size as the top plate, with a down-turned marginal flange, adapted to be placed over the top plate to engage the damper arms and swing the dampers open so the products of combustion may flow from the conduits into the space between the top plate and cover.

4. In a heater, a top plate having openings for the reception of cooking vessels, a bottom plate with a central opening to receive a burner, a marginal lining of heat conserving material around the heater and between the top and bottom plate, said heater having conduits from the central opening in the bottom plate to the openings in the top plate, a damper in each conduit provided with an arm which normally projects up through the adjacent opening in the top plate, said top plate having raised loops or projections, and a cover with a marginal flange which fits around the heater body, and depresses the arms of the said dampers.

Signed at the city of Los Angeles county of Los Angeles State of California, this 22d day of April 1912, in the presence of witnesses.

CHARLES C. COOPER.
HERMAN F. RICHTER.

Witnesses:
EDMUND KASOLD,
J. S. ZERBE.

---

Copies of this patent may be obtained for five cents each, by addressing the "Commissioner of Patents, Washington, D. C."